United States Patent
Yoo et al.

(10) Patent No.: US 7,907,815 B2
(45) Date of Patent: Mar. 15, 2011

(54) METHOD AND APPARATUS FOR SYNCHRONOUS REPRODUCTION OF MAIN CONTENTS RECORDED ON AN INTERACTIVE RECORDING MEDIUM AND ADDITIONAL CONTENTS THEREFOR

(75) Inventors: Jea Yong Yoo, Seoul (KR); Woo Seong Yoon, Kyonggi-do (KR); Limonov Alexandre, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1017 days.

(21) Appl. No.: 10/831,450

(22) Filed: Apr. 23, 2004

(65) Prior Publication Data

US 2005/0019014 A1 Jan. 27, 2005

Related U.S. Application Data

(60) Provisional application No. 60/464,866, filed on Apr. 23, 2003.

(51) Int. Cl.
*H04N 9/80* (2006.01)
(52) U.S. Cl. ......... 386/239; 386/240; 386/241; 386/334
(58) Field of Classification Search .............. 386/95, 386/125, 239, 240, 353; 389/241
See application file for complete search history.

(56) References Cited

U.S. PATENT DOCUMENTS

| 6,173,317 | B1 * | 1/2001 | Chaddha et al. ............... 709/219 |
| 6,580,870 | B1 | 6/2003 | Kanazawa et al. |
| 7,181,636 | B2 * | 2/2007 | Kim et al. ...................... 713/400 |
| 7,505,992 | B2 * | 3/2009 | Collart .......................... 707/102 |
| 7,519,616 | B2 * | 4/2009 | Hayes et al. ...................... 1/1 |
| 2002/0053805 | A1 | 5/2002 | Azuchi et al. |
| 2003/0049017 | A1 | 3/2003 | Chung et al. |
| 2003/0084460 | A1 * | 5/2003 | Chung et al. .................. 725/142 |
| 2003/0161615 | A1 * | 8/2003 | Tsumagari et al. ............. 386/95 |

FOREIGN PATENT DOCUMENTS

| CN | 1506945 A | 6/2004 |
| EP | 1 357 749 A1 | 10/2003 |
| JP | 10-136314 | 5/1998 |
| JP | 11-098467 | 4/1999 |
| JP | 11-161663 A | 6/1999 |
| JP | 2002-329372 A | 11/2002 |
| WO | WO-02/054192 A2 | 7/2002 |

\* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

A method and apparatus for synchronized reproduction of main contents recorded on an interactive recording medium and additional contents therefor is disclosed. The additional contents related to the main contents include time information for synchronizing the additional contents with a part of the main contents.

16 Claims, 5 Drawing Sheets

FIG. 3

*XML Document*

```
<realtimestreamingset fontface = "Arial"  color = "FFFFFF"  duration= "300">         ← Global Attribute
    <realtimestreaming time = "00:03:25:2">
        Hello !                         ⟩ Local Attribute
    </realtimestreaming>
    <realtimestreaming time = "00:14:58:14"  duration = "600">
        <vdo src = "file: // cp server / location / video.mpg>
                 ↖ video source
    </realtimestreaming>
    <realtimestreaming time = "01:00:00:0"  color = "FF0000">
        <a href = "www.studio.com" > Visit our website ! </a>
    </realtimestreaming>      hyperlink              clickable object (image)
</realtimestreamingset>
```

FIG. 4

*XML Document*

```
<realtimestreamingset fontface = "Arial"  color = "FFFFFF"  duration= "300">         ← Global Attribute
    <realtimestreaming time = "00:03:25:2">
        Hello !                         ⟩ Local Attribute
    </realtimestreaming>
    <realtimestreaming time = "00:14:58:14"  duration = "600">
        <img src = "file: // drive: / location /image.jpg>
                 ↖ image source
    </realtimestreaming>
    <realtimestreaming time = "01:00:00:0"  color = "FF0000">
        <a href = "www.studio.com" > Visit our website ! </a>
    </realtimestreaming>      hyperlink              clickable object (image)
</realtimestreamingset>
```

FIG. 5

*Table For Realtime Data Presentation*

| Item | Attribute | Bytes | Contents |
|---|---|---|---|
| Subtitle | Type | 2B | text data, image, etc |
| | Font | 2B | italic, bold, etc |
| | Color | 2B | red, blue, black, etc |
| | Time | 2B | presentaion strat time |
| | Duration | 2B | presentaion duration |
| | Max Size | 2B | maxium size |
| | D_Position | 2B | horizontal / vertical display position |
| | M_Location | 4B | address where real data is stored |
| | Size | 4B | size of stored data |
| | ⋮ | ⋮ | ⋮ |
| Subpicture | Type | 2B | jpg, bmp, clickable object, etc |
| | Time | 2B | presentaion strat time |
| | Duration | 2B | presentaion duration |
| | Size | 2B | maxium size |
| | D_Position | 2B | horizontal / vertical display position |
| | M_Location | 4B | address where real data is stored |
| | Size | 4B | size of stored data |
| | ⋮ | ⋮ | ⋮ |
| Video | Type | 2B | mpg2, mpg4, etc |
| | Time | 2B | presentaion strat time |
| | Duration | 2B | presentaion duration |
| | Size | 2B | maxium size |
| | D_Position | 2B | horizontal / vertical display position |
| | M_Location | 4B | address where real data is stored |
| | Size | 4B | size of stored data |
| | ⋮ | ⋮ | ⋮ |

FIG. 6
case 1
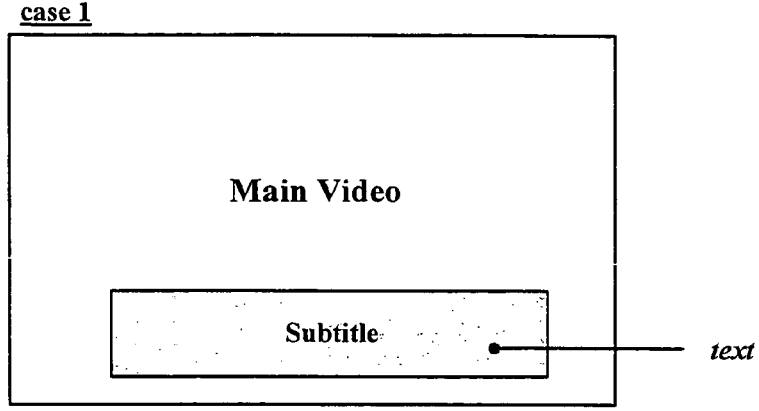
case 2
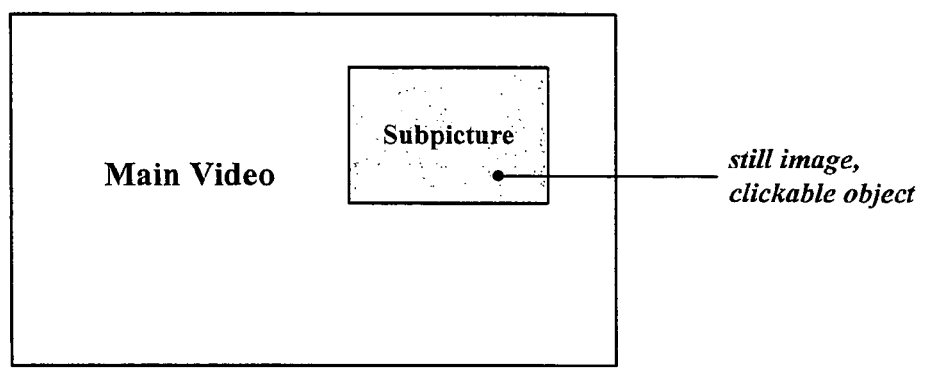
case 3
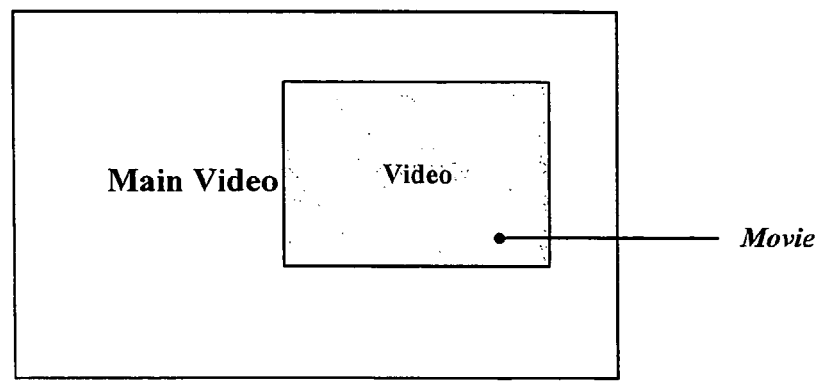

METHOD AND APPARATUS FOR SYNCHRONOUS REPRODUCTION OF MAIN CONTENTS RECORDED ON AN INTERACTIVE RECORDING MEDIUM AND ADDITIONAL CONTENTS THEREFOR

CROSS REFERENCE TO RELATED APPLICATIONS

Pursuant to 35 U.S.C. §119, this application claims the benefit of earlier filing date and right of priority to U.S. Provisional Application No. 60/464,866, filed on Apr. 23, 2003, the contents of which is hereby incorporated by reference herein in their entirety.

BACKGROUND OF THE INVENTION

1. Field of the Invention

The present invention relates to a method and apparatus for synchronous reproduction of main contents recorded on an interactive recording medium and additional contents therefor.

2. Description of the Related Art

High-density optical disks capable of storing large amounts of high-quality digital video/audio data have been widely used. The DVD (digital versatile disk) is one example of these high-density optical disks.

The DVD includes a data stream recording area in which digital video contents are stored and a navigation data recording area in which navigation data required for playback control of the video contents is stored.

When a DVD is loaded into a DVD reproducing apparatus, the DVD reproducing apparatus first reads the navigation data recorded in the navigation data recording area and stores the navigation data in an internal memory. The DVD reproducing apparatus then reproduces the video contents recorded in the data stream recording area using the navigation data.

In the meantime, the development of new interactive DVDs is being progressing. Unlike the DVD, the interactive DVD (hereinafter referred to as iDVD) contains additional contents data related to the main A/V data recorded thereon.

The additional contents (also called ENAV data in iDVDs) generally comprises a document part including markup languages (e.g., XHTML or SMIL) and cascading style sheets and a data part including JPEG or PNG images, AC-3, MPEG, DTS, or SDDS audio data, MNG animation, and/or text.

Various additional contents pertaining to main A/V data recorded on a recording medium provides users more flexibility and thus allows the users to enjoy the main AN contents more effectively.

The additional contents pertaining to the main contents recorded on a recording medium need to be the latest information. It may be possible to provide the additional contents through a broadband communications network (e.g., the Internet) as well as through the recording medium. An iDVD reproducing apparatus, therefore, is required to be able to play the main A/V data recorded thereon in synchronization with a part of additional contents provided from an external source if the part is intended for synchronized reproduction.

SUMMARY OF THE INVENTION

It is an object of the present invention to provide a method and apparatus for presenting main A/V data recorded on an interactive recording medium in synchronization with additional data pertaining to the main data after obtaining the additional data from an external source. The method and apparatus of the present invention in particular focuses on real-time additional contents.

The method for reproducing a recording medium in accordance with the present invention comprises the steps of obtaining additional data related to the main data recorded on the recording medium and presenting the additional data together with the main data, wherein the additional data includes time information for synchronizing the additional data with the main data.

The apparatus for reproducing a recording medium in accordance with the present invention comprises means for obtaining additional data related to main data recorded on the recording medium, storage means for storing the obtained additional data, and means for determining a part of the main data to be presented in synchronization with the additional data based on the time information and presenting the part together with the additional data.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIGS. 3 and 4 illustrate exemplary embodiments of document parts of additional data in accordance with the present invention;

FIG. 5 illustrates an exemplary table structure created by analyzing additional data for presenting the additional data in synchronization with main data; and FIG. 6 illustrates an exemplary screen on which main data and additional data are displayed together.

DETAILED DESCRIPTION OF THE PREFERRED EMBODIMENTS

In order that the invention may be fully understood, preferred embodiments thereof will now be described with reference to the accompanying drawings.

Figure 1:
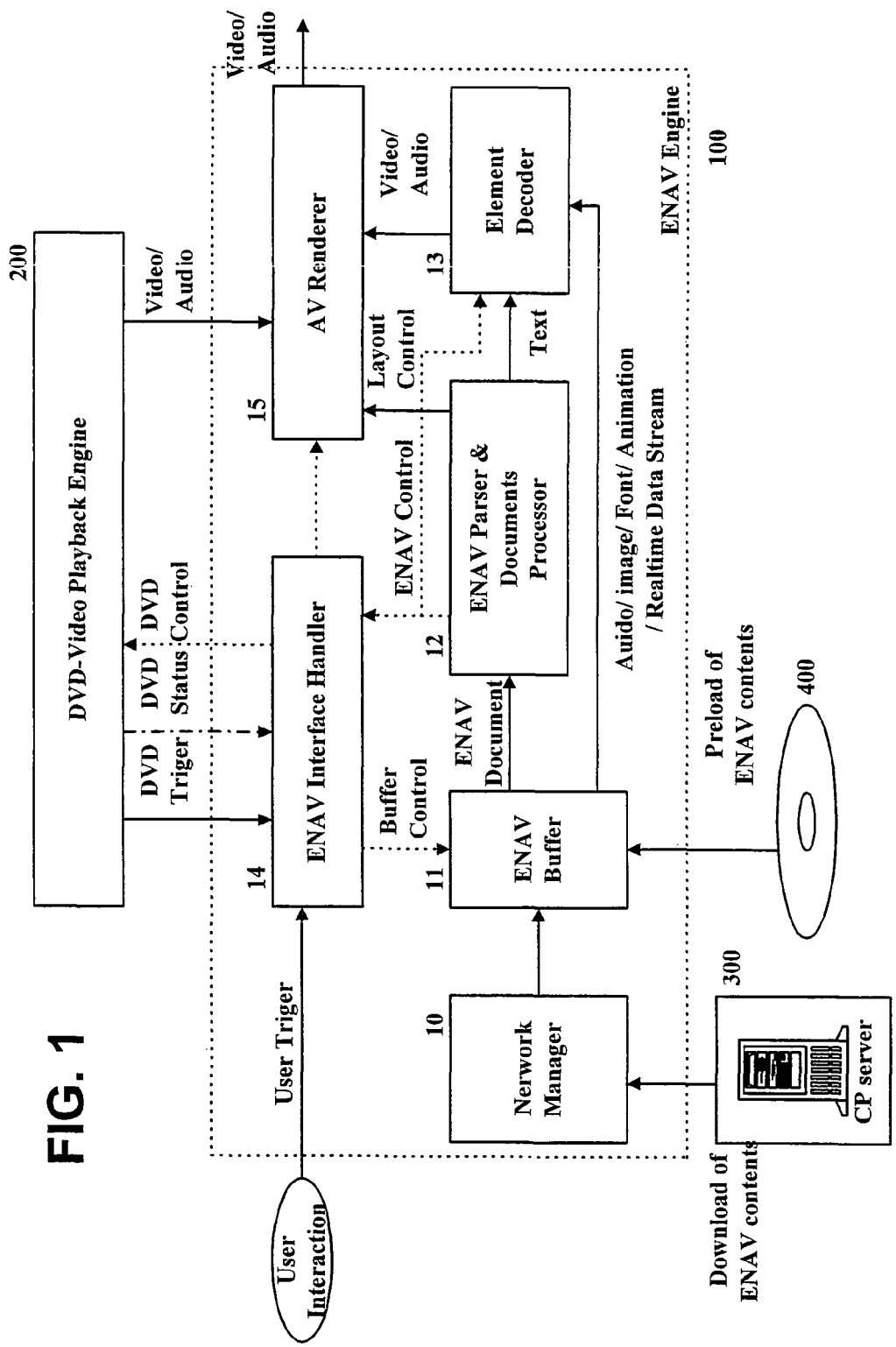
FIG. 1 illustrates a block diagram of an embodiment of an interactive optical disk reproducing apparatus in accordance with the present invention.

FIG. 1 illustrates a block diagram of an embodiment of an interactive optical disk reproducing apparatus in accordance with the present invention. The apparatus comprises a DVD-video playback engine 200 for reproducing main A/V data recorded on an iDVD 400 and an ENAV engine 100 for reproducing additional contents data. The ENAV engine 100 of the present invention comprises a network manager 10 for connecting to and communicating with an external network, an ENAV buffer 11 for storing ENAV data, an ENAV parser and documents processor 12 for separating the ENAV data into several components on an attribute basis and processing document parts, an element decoder 13 for decoding the ENAV data on an attribute basis, an ENAV interface handier 14 for processing and controlling inputs related to the ENAV data, and an A/V renderer 15 for outputting video data together with audio data after placing the video data on a video layer.

The network manager 10 downloads the latest data or selected data among various ENAV contents data related to the main contents recorded on the iDVD 400 from a contents providing server 300 and stores the data in the ENAV buffer 11. The ENAV buffer 11 may be loaded with ENAV contents recorded on the iDVD 400 prior to the playback of the main contents.

The element decoder 13 decodes audio, images, text, animation data, and/or real-time data streams (e.g., video streams) constituting the ENAV data on an attribute basis. The ENAV interface handler 14 controls the user input and the ENAV buffer 11, conducts operations required for the ENAV parser and documents processor 12, and exchanges signals (e.g., DVD trigger, DVD status, and DVD control) required for its operation with the DVD-video playback engine 200.

The contents providing server 300 stores additional contents data associated with main contents data of a plurality of iDVDs and provides additional contents pertaining to a selected iDVD or selected main A/V contents. The provided additional contents may be images, animation data, or real-time data streams. Real-time data streams, which require real-time playback, are subtitle streams including text or caption data, subpicture streams including still images or clickable objects, or video streams. The additional contents are downloaded through the network manager 10 and stored in the ENAV buffer 11.

Figure 2:
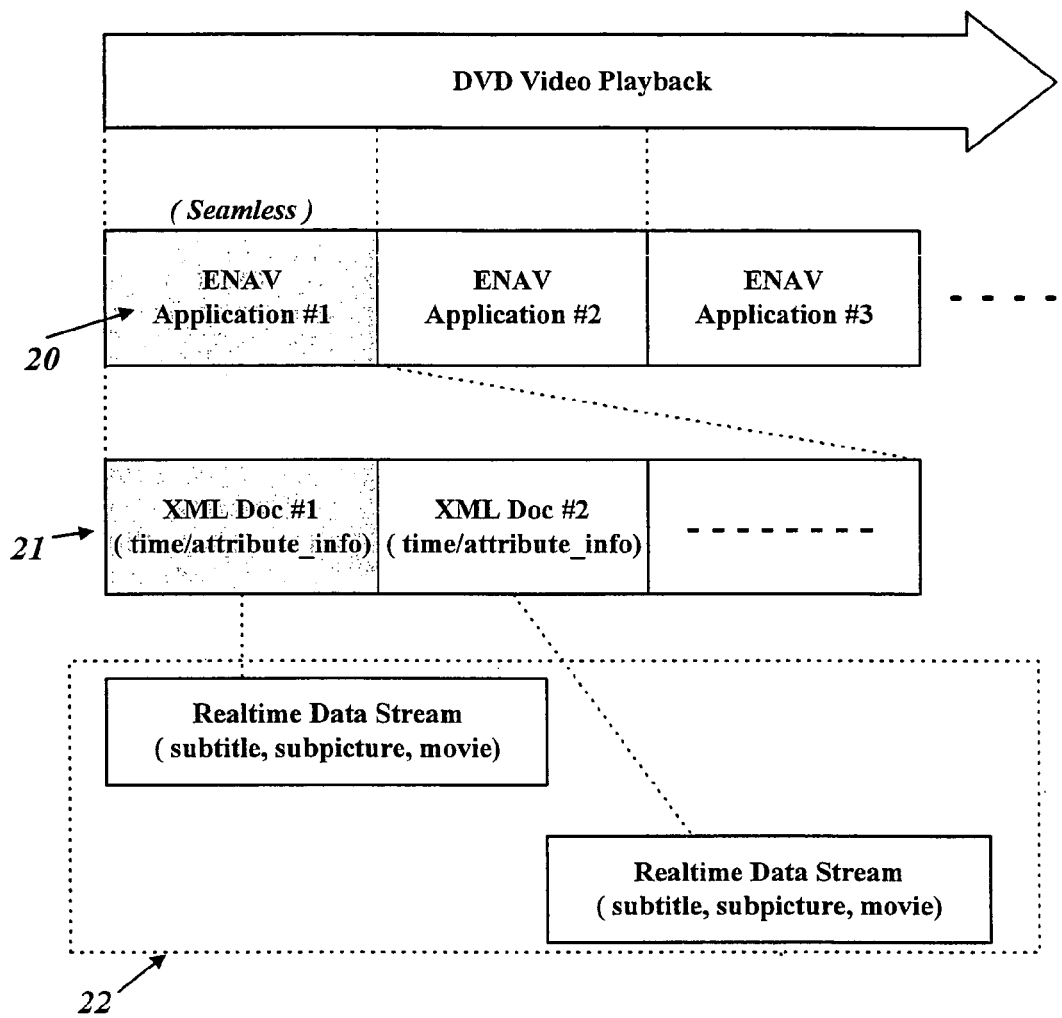
FIG. 2 illustrates an embodiment of additional data to be presented together with main AN data recorded on a recording medium.

As shown in FIG. 2, the ENAV data provided from the contents providing server 300 comprises at least one ENAV application (ENAV Application #1, #2, #3, ... ). The ENAV data may be pre-recorded on the iDVD 400 instead of being provided from the contents providing server 300. Even in this case, if ENAV data recorded thereon is not the latest version, the latest ENAV data may be downloaded from the contents providing server 300 and stored in the ENAV buffer 11.

An ENAV application 20 comprises a document part 21 and a data part 22. As shown in FIGS. 3 and 4, the document part may be written in XML languages and the XML document contains link information for the additional contents (e.g., real-time data streams) and time/attribute information required for the presentation of the additional contents. The time information recorded in the XML document is indicative of the synchronization point of the main A/V data reproduced from the iDVD 400. For-example, if the main ANV data comprises packetized elementary stream (PES) packets and each PES packet has a presentation time stamp (PTS), the PTS of a PES packet to be synchronized with a data part linked to an XML document or included in the XML document is recorded as the time information of the XLM document.

FIG. 3 illustrates an exemplary embodiment of the XML document in accordance with the present invention. At least one element <realtimestreaming> included in a root element <realtimestreamingset> specifies presentation attribute information (or link information) of the data part linked to the element or included in an XML document. In FIG. 3, the root element <realtimestreamingset> specifies fontface="Arial", color="FFFFFF" (white), and presentation duration="300" as the global attribute of the data part. Each of the included elements may also specify a local attribute, in which case the local attribute specified by the element overrides the global attribute specified by the root element.

In FIG. 3, the element <realtimestreaming>regarding a text "Hello !" specifies time="00:03:25:2" as the local time/attribute information of the corresponding data part ("Hello !"). The time information is in the format of hour:minute:second:frame. The unit of the frame depends on the frame rate of the stream, i.e., if the frame rate is 30 frames/sec, the value of 2 indicates 2/30 seconds. The time information determines the main AN data to be presented simultaneously. The element <realtimestreaming> regarding a real-time video data file "video.mpg" specifies "file://cp server/location/video.mpg" as link information, time="00:14:58:14" as time/attribute information, and duration="600" as presentation duration information. The local attribute information takes precedence over the global attribute information. The video data file "video.mpg" will be presented for 600 seconds (or frames) from 14 minutes 58.467 seconds. If the total running time of the video data file is not as long as the duration, the video data is presented repeatedly during the presentation duration. Because the document is processed by the ENAV parser and documents processor 12 prior to the playback of the video data, the video data is downloaded from a location specified by the link information and stored in the ENAV buffer 11 prior to its playback. The element <realtimestreaming> regarding the clickable object comprising a hyperlink www.studio.com and a click test "Visit Our Website!" specifies time=01:00:00:0 and color="FF000".

FIG. 4 illustrates an exemplary embodiment of an XML document that specifies image data instead of video data as its data part. In this case, the link information for the data part is specified as "file://drive/location/image.jpg", which indicates that the data part is already recorded on the recording medium iDVD 400. The remainder of the XML document is the same as that shown in FIG. 3.

The synchronized presentation of the main A/V data of the iDVD 400 and ENAV data thereof will now be described in detail.

Receiving ENAV data, i.e., ENAV applications as shown in FIG. 2-4, the interactive optical disk reproducing apparatus of FIG. 1 stores the ENAV applications in the ENAV buffer 11. The ENAV parser and documents processor 12 analyze the stored ENAV applications one stores it in the ENAV buffer 11. The table shown in FIG. 5 includes several elements arranged based on the element type, each item corresponding to an element. FIG. 5 illustrates three items, subtitle, subpicture, and video.

The subtitle item includes various fields such as the type, font, color, presentation time, presentation duration, maximum size, display position, memory location in which the data is stored, and data size. The type field stores information for indicating whether the subtitle is text data or image data. The information in each field may be either obtained by processing the received document, or preset according to the type of the item. The maximum size field is preset with a view to limiting the size of the image or video to be presented on a screen. During the presentation of ENAV data, the element decoder 13 limits the ENAV data to the maximum size if its actual size exceeds the maximum size.

The memory location field stores the physical address of the data (e.g., subtitle stream, subpicture stream, or video stream) stored in the buffer 11 or other storage devices based on the link information specified in the document. The data size field stores the size of the stored data.

The subpicture item has the same fields as the subtitle item except for font and color fields. The values of its fields in the subpicture item are obtained exactly as in the subtitle item. The type field stores information indicative of the type of the subpicture such as JPEG image data, BMP image data, or clickable object data. The type of the subpicture is identified from the extension of the file linked by the link information specified by the document.

The video item has the same fields as the subpicture item and the values of its fields are obtained exactly as in the subpicture item. The type field stores information indicative of the type of the video such as MPEG2 video data or MPEG4 video data. The type of the video data is identified from the extension of the file linked by the link information specified by the document.

Once the table as shown in FIG. 5 is created in the ENAV buffer 11, the ENAV interface handler 14 starts playback of the iDVD 400 by sending a playback start signal to the DVD=video playback engine 200. Receiving the playback start signal, the DVD-video playback engine 200 decodes main A/V data reproduced from the iDVD 400 and outputs the decoded data to the A/V renderer 15. As soon as the playback starts, the DVD-video playback engine 200 sends a DVD trigger signal to the ENAV interface handler 14 for presentation synchronization.

The presentation time of each of the elements shown in FIG. 5 is calculated based on the DVD trigger signal. The ENAV interface handler 14 keeps track of time that has elapsed since the trigger point. If the value of the presentation time field of an element stored in the table coincides with the time, the ENAV interface handler 14 reads the data of the element (e.g., subtitle, subpicture, or video stream) from the buffer 11 or other storage devices and provides the data to the element decoder 13 in order that the data can be decoded.

Alternatively, the DVD-video playback engine 200 may provide the PTS included in each PES packet being decoded to the ENAV interface handler 14, which provides the data of an element the presentation time field of which is closest to the PTS value to the element decoder 13.

The A/V renderer 15 constructs a screen on which subtitle, subpicture, and video data decoded by the DVD-video playback engine 200 and the element decoder 13 are placed as specified by its coordinates. The position of the ENAV data is specified by the position information of the table as shown in FIG. 5 provided from the ENAV interface handler 14 or is obtained from the position information provided by the ENAV parser and documents processor 12 that interprets the document part stored in the buffer 11 during the reproduction of the iDVD 400.

The method in accordance with the present invention provides the user of an interactive recording medium with various services related to the contents of the recording medium by presenting the additional contents pertaining to the main contents in synchronization with the main contents embodiments, those skilled in the art, having the benefit of this disclosure, will appreciate numerous modifications and variations therefrom. It is intended that all such modifications and variations fall within the spirit and scope of the invention.

What is claimed is:

1. A method for reproducing data, comprising:
   obtaining a document part of additional data related to main data recorded on a recording medium from an external server through a communications network, the additional data comprising a data part to be presented and the document part including control information for the data part, and the control information including time information for presenting the data part in time synchronization with the main data and on a part of the main data and link information for linking the document part to the data part;
   analyzing the document part;
   receiving the data part from selectively any one of the external server and the recording medium based on the link information; and
   presenting the data part in time synchronization with and on the main data by using the control information.

2. The method set forth in claim 1, wherein the step of obtaining the document part comprises:
   obtaining latest additional data from the external server through the communications network.

3. The method set forth in claim 1, wherein the data part is a real-time data stream including at least one of a subtitle stream, a sub-picture stream, and a video stream.

4. The method set forth in claim 1, wherein the document part is written in the XML and wherein the step of analyzing the document part comprises analyzing the XML document and the step of presenting the data part includes using the analyzed XML document to present the additional data.

5. The method set forth in claim 1, wherein the control information further includes presentation attribute information for the data part.

6. The method set forth in claim 5, wherein the control information further includes presentation duration information for the data part and presentation position information indicative of the position at which the data part will be presented.

7. The method set forth in claim 1, further comprising:
   storing an analysis result resulting from the step of analyzing in a storage medium other than the recording medium; and
   obtaining from the recording medium or the external server a separate data file that is not included in the additional data.

8. The method set forth in claim 7, further comprising:
   adding information on a storage location and size of the analysis result to the analyzed document.

9. An apparatus for reproducing data, comprising:
   a data reproduction device configured to reproduce data recorded on a recording medium;
   a communications device configured to connect to and communicate with an external communications network;
   a main decoder configured to decode main data reproduced by the data reproduction device;
   a controller configured to store additional data that is reproduced by the data reproduction device or received through the communications device in a storage device and to control the presentation time of the additional data, the additional data comprising a data part to be presented and a document part including control information for the data part, and the control information including time information for presenting the data part in time synchronization with the main data and on a part of the main data and link information for linking the document part to the data part; and
   a subdecoder configured to analyze and decode the additional data,
   wherein the controller is configured to receive the data part from selectively any one of the external server and the recording medium based on the link information and to present the data part in time synchronization with and on the main data using the control information.

10. The apparatus set forth in claim 9, wherein the data part is a real-time data stream.

11. The apparatus set forth in claim 9, wherein the control information further includes presentation attribute information for the data part.

12. The apparatus set forth in claim 9, wherein the data part is a PES packet defined in the MPEG standard.

13. The apparatus set forth in claim 9, wherein the additional data comprises at least one ENAV application.

14. The apparatus set forth in claim 9, wherein the controller is configured to:
   store an analysis result from the subdecoder in a storage medium other than the recording medium; and obtain a separate data file that is not included in the additional data from the recording medium or through the communications device.

15. The apparatus set forth in claim 14, wherein the controller is configured to further add information about a storage location and a size of the analysis result to the analyzed information.

16. The apparatus set forth in claim 14, further comprising:
a storage device configured to store the obtained additional data,
wherein the controller is configured to cause the communications device to obtain the document part of the additional data.

\* \* \* \* \*